(12) United States Patent
Porcheron et al.

(10) Patent No.: US 9,339,787 B2
(45) Date of Patent: May 17, 2016

(54) POLYMETALLIC CAPTURE MASS FOR CAPTURING HEAVY METALS

(71) Applicant: IFP Energies nouvelles, Rueil-Malmaison (FR)

(72) Inventors: Fabien Porcheron, Rueil Malmaison (FR); Arnaud Baudot, Vernaison (FR); Karin Barthelet, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 204 days.

(21) Appl. No.: 14/109,138

(22) Filed: Dec. 17, 2013

(65) Prior Publication Data

US 2014/0175334 A1    Jun. 26, 2014

(30) Foreign Application Priority Data

Dec. 21, 2012  (FR) ...................... 12 62526
Dec. 21, 2012  (FR) ...................... 12 62527

(51) Int. Cl.

| | |
|---|---|
| *B01J 20/02* | (2006.01) |
| *B01J 20/32* | (2006.01) |
| *B01D 15/26* | (2006.01) |
| *B01D 53/64* | (2006.01) |
| *B01J 20/08* | (2006.01) |
| *B01J 20/28* | (2006.01) |
| *B01J 20/30* | (2006.01) |

(52) U.S. Cl.
CPC ............ *B01J 20/0266* (2013.01); *B01D 15/26* (2013.01); *B01D 53/64* (2013.01); *B01J 20/0218* (2013.01); *B01J 20/0222* (2013.01); *B01J 20/0225* (2013.01); *B01J 20/0229* (2013.01); *B01J 20/0237* (2013.01); *B01J 20/0285* (2013.01); *B01J 20/08* (2013.01); *B01J 20/28019* (2013.01); *B01J 20/28042* (2013.01); *B01J 20/28057* (2013.01); *B01J 20/28069* (2013.01); *B01J 20/3078* (2013.01); *B01J 20/3085* (2013.01); *B01J 20/3204* (2013.01); *B01J 20/3236* (2013.01); *B01J 20/3293* (2013.01); *B01D 2253/1128* (2013.01); *B01D 2253/304* (2013.01); *B01D 2253/306* (2013.01); *B01D 2253/311* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/20784* (2013.01); *B01D 2256/245* (2013.01); *B01D 2257/602* (2013.01)

(58) Field of Classification Search
None
See application file for complete search history.

(56) References Cited

U.S. PATENT DOCUMENTS

| | | | | |
|---|---|---|---|---|
| 5,080,799 | A * | 1/1992 | Yan ......................... | C02F 1/288 210/661 |
| 6,033,556 | A * | 3/2000 | Didillon ................... | B01J 20/02 208/253 |
| 7,704,920 | B2 * | 4/2010 | Yang ...................... | B01D 53/02 423/210 |
| 2010/0320153 | A1 * | 12/2010 | Cousins ................... | B01J 20/02 210/688 |
| 2013/0053234 | A1 | 2/2013 | Fish et al. | |

FOREIGN PATENT DOCUMENTS

| | | | |
|---|---|---|---|
| FR | 2764214 | A1 | 12/1998 |
| JP | 51027866 | * | 3/1976 |
| WO | 2011021024 | A1 | 2/2011 |

OTHER PUBLICATIONS

Search Report for FR1262526 dated Aug. 16, 2013.

* cited by examiner

*Primary Examiner* — Tanisha Diggs
(74) *Attorney, Agent, or Firm* — Millen White Zelano and Branigan, PC; Csaba Henter; Anthony Zelano

(57) ABSTRACT

The invention concerns a capture mass for capturing heavy metals in a liquid or gaseous effluent, comprising a porous solid support, copper sulphide and at least one second metal sulphide the metal of which is selected from the group constituted by chromium, manganese, iron, cobalt and nickel, and in which the ratio of the percentage by weight of the metal or metals other than copper to the percentage by weight of copper is in the range 0.01 to 2. The invention also concerns a process for preparing said capture mass and a process for capturing heavy metals in a gaseous or liquid effluent, in which said effluent is brought into contact with said capture mass.

19 Claims, 1 Drawing Sheet

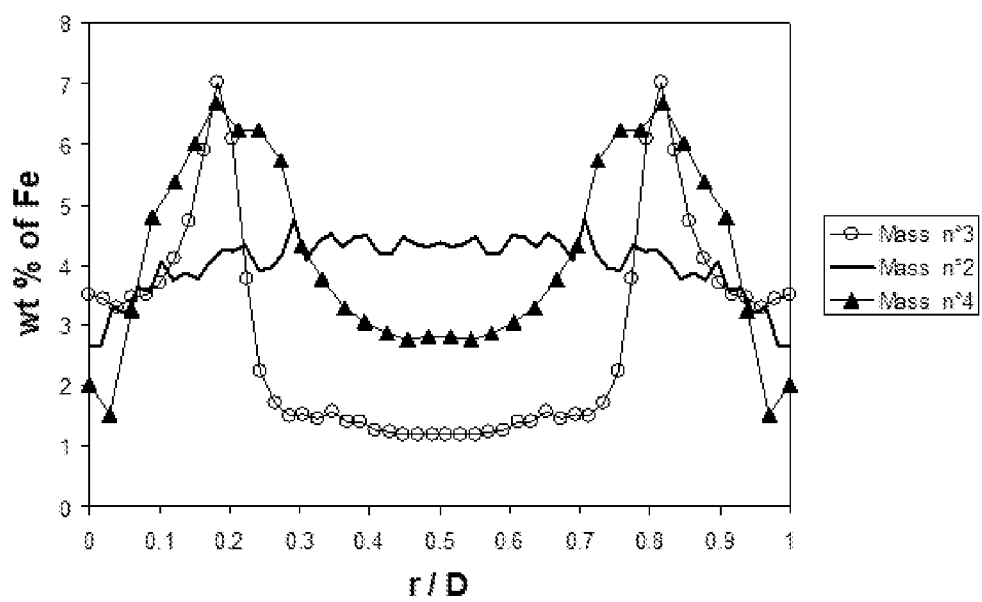

POLYMETALLIC CAPTURE MASS FOR CAPTURING HEAVY METALS

FIELD OF THE INVENTION

The present invention relates to the field of treatment of liquid or gaseous effluents containing heavy metals, in particular effluents of oil origin and their derivatives such as industrial gas, for example synthesis gas, natural gas and liquid hydrocarbons. More precisely, the invention concerns capturing heavy metals, in particular mercury, which are present in a gaseous or liquid effluent with the aid of a capture mass comprising at least two active metallic compounds: copper sulphide, and a second metal sulphide the metal of which is selected from the group constituted by chromium (Cr), manganese (Mn), iron (Fe), cobalt (Co) and nickel (Ni).

PRIOR ART

Mercury is a metallic contaminant which is found in gaseous hydrocarbons or liquids produced in many regions of the world such as the Gulf of Niger, South America, North Africa or the Asia-Pacific region.

The elimination of mercury from hydrocarbons is desirable from an industrial viewpoint for a number of reasons.

Firstly, the presence of mercury in those hydrocarbons is a risk to operators working in contact with these substances because mercury is toxic. In its elemental form, mercury is volatile and runs severe risks of neurotoxicity by inhalation. In its organic form, mercury gives rise to risks which are similar to neurotoxicity by skin contact.

Secondly, the presence of mercury in hydrocarbons has a deleterious effect on conventional processing operations which are intended to upgrade those hydrocarbons. Conventionally, the hydrocarbons undergo catalytic reactions such as selective hydrogenation of the olefins produced by steam cracking or catalytic cracking of liquid hydrocarbons. However, the catalysts generally used, comprising noble metals such as platinum and palladium, may be deactivated by the mercury. In fact, mercury induces sintering of the catalysts by amalgamating nanoparticles of noble metals. The reduction in the specific surface area of the catalysts leads to a very substantial loss of their catalytic activity.

For these reasons and more, it is desirable to eliminate or at least reduce the concentration of mercury in the gaseous or liquid hydrocarbon effluents.

Industrially, the elimination of mercury from gaseous or liquid effluents is carried out by moving the effluent to be treated through guard beds filled with adsorbent materials, otherwise known as capture masses. The impurity to be eliminated, in this case mercury, is then irreversibly retained, preferably by chemisorption, in or at the surface of the capture mass and the effluent evacuated from the capture mass bed is thus purified.

In a capture mass, mercury can be captured by reacting the mercury with an active phase based on elemental sulphur. In fact, elemental sulphur S reacts irreversibly with elemental mercury, Hg°, as follows:

$$Hg°(g/l)+S(s) \rightarrow HgS(s) \qquad (1)$$

The term "Hg° (g/l)" means that the mercury is dissolved in a gaseous (g) or liquid (l) fluid phase. In contrast, "(s)" denotes solid phases constituted by the active phase of the capture mass and by the reaction product.

Reaction (1) is spontaneous and has a negative free energy, ΔG (kJ/mole) over a wide temperature range, typically 0° C. to 150° C. The product formed, HgS, known as cinnabar or metacinnabar, is a chemically inert, mineral phase which is a solid over a vast range of temperatures. Thus, the mercury is trapped in the capture mass and the effluent to be treated is purified.

Conventionally, capture masses based on elemental sulphur are obtained by a method for impregnating elemental sulphur onto an activated charcoal type support.

However, capture masses based on elemental sulphur deposited on activated charcoal frequently suffer from stability problems when the effluent to be treated is liquid or when the effluent to be treated is gaseous and wet, since the active phase can be entrained by the water or another liquid. This phenomenon, linked to the low energetic interaction between the active phase and the surface of the activated charcoal and to the solubility of sulphur in these media, causes a drastic drop in the service life of capture masses.

In order to overcome these disadvantages, it is possible to use capture masses based on metal sulphides deposited on supports with a controlled porosity such as aluminas, for example. Copper sulphide is notably used because of its stability and its low manufacturing costs. Patent document U.S. Pat. No. 7,645,306 describes the fact that elemental mercury (Hg°) reduces copper sulphide CuS irreversibly in accordance with the following reaction:

$$Hg°(g/l)+2CuS(s) \rightarrow Cu_2S(s)+HgS(s) \qquad (2).$$

This reaction is a gas/solid or liquid/solid reaction which is more favoured from the point of view of its kinetics as the specific surface area of the active phase, in this case the CuS, is increased.

Capture masses based on metal sulphides are conventionally prepared by depositing a metal precursor in the oxide form, for example CuO, onto a support then carrying out a sulphurizing step in order to transform the metal oxide into a metal sulphide. A capture mass containing a support and copper sulphide is described, for example, in U.S. Pat. No. 4,094,777 published in 1978.

Other metal sulphides may also be used to capture mercury. Patent document GB 2 428 598 describes the use of metal sulphides the metals of which belong to the first row of transition metals in the periodic classification of the elements, in particular manganese (Mn), iron (Fe), cobalt (Co), nickel (Ni), copper (Cu) and zinc (Zn), in order to purify the gas for regeneration of an adsorbent for heavy metals.

However, the use of metal sulphides, in particular copper sulphides, cannot overcome all of the problems linked to capturing heavy metals in gaseous or liquid effluents. In particular, it has been shown that beyond a certain content, the retention capacity for heavy metals of the capture mass is only slightly or no longer improved despite an increase in the metal sulphide content. In fact, FIG. 5 of the article by W. R. A. M Robinson and J. C. Mol ("Characterization and Catalytic Activity of Copper/Alumina Methanol Synthesis Catalysts", *Applied Catalysis*, 44 (1988) 165-177) shows that, for contents of more than 8.5% by weight of copper with respect to the mass of $CuO/Al_2O_3$ catalyst, the specific surface area of copper per gram of catalyst reduces. This can be explained by the fact that beyond a certain quantity of active phase, the copper oxide crystallites have a tendency to agglomerate into coarser clusters. This could render a portion of the active phase inaccessible and also cause partial blocking of the pores, and hence a deterioration in material transfer. Thus, it is difficult to obtain capture masses with a high capacity for heavy metal retention.

Finally, patent document WO 2011/021024, which claims a capture mass for heavy metals, in particular mercury, which is based on alumina onto which a shell of CuS is deposited, advises limiting the presence of other metal sulphides such as calcium sulphide, zinc sulphide, iron sulphide, nickel sulphide, manganese sulphide and chromium sulphide to less than 1% by weight, or even to less than 0.1% by weight. The presence of these metals is thus considered to be deleterious to the mercury capture process.

In this context, one of the aims of the present invention is to propose a capture mass which does not suffer from the disadvantages of prior art capture masses, advantageously with a large retention capacity for heavy metals and which can be used to treat liquid and gaseous or even wet effluents and which has a good service life.

BRIEF DESCRIPTION OF THE INVENTION

The Applicant has discovered that surprisingly, the capture masses of the invention have improved heavy metal adsorption performances, in particular for mercury, and can advantageously achieve the aims identified above.

In the first instance, the present invention provides a capture mass for capturing heavy metals in a liquid or gaseous effluent, comprising a porous solid support, copper sulphide and at least one second metal sulphide the metal of which is selected from the group constituted by chromium, manganese, iron, cobalt and nickel, and in which the ratio of the percentage by weight of the metal or metals other than copper to the percentage by weight of copper is in the range 0.01 to 2.

This capture mass can be qualified as polymetallic in that it contains at least two metal sulphides based on different metals. It has been discovered that the two types of metal sulphides, including copper sulphide, act in a synergistic manner in the capture mass if a certain ratio of the percentage by weight of the metal or metals other than copper to the percentage by weight of copper is complied with. The Applicant has demonstrated that the adsorption capacity at saturation of the heavy metals of the capture masses of the invention is surprisingly greater than that obtained by adding the adsorption capacities of each of the metal sulphides present on the capture mass.

The capture mass of the invention may advantageously be used to capture heavy metals contained in both liquid and gaseous effluents, be they dry or wet.

The invention also concerns a process for the preparation of said capture mass. This preparation process may comprise the following steps:
A. preparing a material comprising a porous solid support, a copper compound and at least one second metallic compound the metal of which is selected from the group constituted by chromium, manganese, iron, cobalt and nickel, comprising the following sub-steps:
  a. preparing an aqueous solution containing at least one copper precursor and at least one precursor of a metal selected from the group constituted by chromium, manganese, iron, cobalt and nickel;
  b. impregnating a porous solid support with an aqueous solution obtained at the end of step (a);
  c. maturing the impregnated support obtained at the end of step (b) in a sealed vessel saturated with water;
  d. drying the material obtained at the end of step (c); and
B. sulphurizing the material obtained at the end of step (A) to transform the metallic compounds into metal sulphides.

Alternatively, this preparation process may comprise the following steps:
A. preparing a material comprising a porous solid support, a copper compound and at least one second metallic compound the metal of which is selected from the group constituted by chromium, manganese, iron, cobalt and nickel, comprising the following sub-steps:
  a'. preparing a first aqueous solution containing at least one copper precursor;
  a". preparing a second aqueous solution containing at least one precursor of a metal selected from the group constituted by chromium, manganese, iron, cobalt and nickel;
  b'. impregnating a porous solid support with the first aqueous solution obtained at the end of step (a') and/or with the second aqueous solution obtained at the end of step (a");
  c'. maturing the impregnated support obtained at the end of step (b') in a sealed vessel saturated with water;
  d'. drying the material obtained at the end of step (c');
  e. impregnating the dried material obtained at the end of step (d') with the first aqueous solution obtained at the end of step (a') and/or the second aqueous solution obtained at the end of step (a");
  f. maturing the impregnated support obtained at the end of step (e) in a sealed vessel saturated with water;
  g. drying the material obtained at the end of step (f); and
B. sulphurizing the material obtained at the end of step (A) to transform the metallic compounds into metal sulphides.

In a particularly preferred variation, and when in the process for preparing said capture mass, the metal precursors are deposited either in a single impregnation using a solution containing the precursors of all of the metals to be deposited, or in a plurality of impregnations commencing by impregnation with the copper precursor, the metal or metals other than copper is/are super-concentrated at the periphery of the capture mass. It has been discovered that the two types of metal sulphides, including copper sulphide, act in a more synergistic manner in the capture mass when the metal or metals other than copper are super-concentrated at the periphery of the capture mass. The Applicant has demonstrated that the adsorption capacity at saturation of heavy metals in the capture masses of the invention is surprisingly higher than that obtained by adding the adsorption capacities of each of the metal sulphides present on the capture mass when the metal or metals other than copper are super-concentrated at the periphery of the capture mass.

The capture mass in which the metal or metals other than copper is/are super-concentrated at the periphery of the capture mass may be prepared using a first preparation process. This preparation process may comprise the following steps:
A. preparing a material comprising a porous solid support, a copper compound and at least one second metallic compound the metal of which is selected from the group constituted by chromium, manganese, iron, cobalt and nickel, comprising the following sub-steps:
  a. preparing an aqueous solution containing at least one copper precursor and at least one precursor of a metal selected from the group constituted by chromium, manganese, iron, cobalt and nickel;
  b. impregnating a porous solid support with an aqueous solution obtained at the end of step (a);
  c. maturing the impregnated support obtained at the end of step (b) in a sealed vessel saturated with water;
  d. drying the material obtained at the end of step (c); and
B. sulphurizing the material obtained at the end of step (A) to transform the metallic compounds into metal sulphides.

Alternatively, the preparation process for obtaining a super-concentration of metal or metals other than copper may comprise the following steps:

A. preparing a material comprising a porous solid support, a copper compound and at least one second metallic compound the metal of which is selected from the group constituted by chromium, manganese, iron, cobalt and nickel, comprising the following sub-steps:
   a'. preparing a first aqueous solution containing at least one copper precursor;
   a''. preparing a second aqueous solution containing at least one precursor of a metal selected from the group constituted by chromium, manganese, iron, cobalt and nickel;
   b'. impregnating a porous solid support with the first aqueous solution obtained at the end of step (a');
   c'. maturing the impregnated support obtained at the end of step (b') in a sealed vessel saturated with water;
   d'. drying the material obtained at the end of step (c');
   e. impregnating the dried material obtained at the end of step (d') with the second aqueous solution obtained at the end of step (a'');
   f. maturing the impregnated support obtained at the end of step (e) in a sealed vessel saturated with water;
   g. drying the material obtained at the end of step (f); and
B. sulphurizing the material obtained at the end of step (A) to transform the metallic compounds into metal sulphides.

Finally, the invention also concerns a process for capturing heavy metals in a gaseous or liquid effluent in which said effluent is brought into contact with said capture mass.

BRIEF DESCRIPTION OF THE FIGURES

FIG. 1 represents the distribution of iron (as a % by weight) in three capture masses described in Example 2 constituted by particles, as a function of the depth in the particle measured by the ratio r (depth of region analysed in the particle) over D (particle diameter). This FIGURE was obtained by Castaing microprobe analysis of the particles of the capture masses mentioned.

DETAILED DESCRIPTION OF THE INVENTION

It should be pointed out that throughout this description, the expression "in the range . . . to . . . " should be understood to include the cited limits.

Thus, the invention concerns a capture mass for capturing heavy metals in a liquid or gaseous effluent, comprising a porous solid support, copper sulphide and at least one second metal sulphide the metal of which is selected from the group constituted by chromium, manganese, iron, cobalt and nickel, and in which the ratio of the percentage by weight of the metal or metals other than copper to the percentage by weight of copper is in the range 0.01 to 2.

The capture mass of the invention contains an active phase which comprises metals which, in the sulphide form, react with the heavy metals. The active phase of the capture mass of the invention comprises copper sulphide and at least one second metal sulphide the metal of which is selected from the group constituted by chromium, manganese, iron, cobalt and nickel.

The expression "copper sulphide" as used in the present application denotes chemical compounds of the $Cu_xS_y$ type with $0.5 \leq x/y < 2$; preferably, $x=1$ and $y=1$. Preferably, the expression "copper sulphide" denotes CuS. Copper sulphide is the first metal sulphide contained in the capture mass of the invention.

The other metal sulphide or sulphides contained in the capture mass of the invention is/are based on a metal selected from the group constituted by chromium (Cr), manganese (Mn), iron (Fe), cobalt (Co) and nickel (Ni). Preferably, the metal or metals of the other metal sulphide or sulphides is/are selected from the group constituted by manganese (Mn), iron (Fe) and nickel (Ni). The pairings of copper sulphide/manganese sulphide and copper sulphide/iron sulphide are particularly preferred. The metal of the second metal sulphide of the capture mass may thus be selected from the group constituted by manganese and iron.

The total percentage by weight of metals, expressed with respect to the total weight of the capture mass, may be in the range 1% to 60%, preferably in the range 5% to 40%, and more preferably in the range 6% to 30%.

The total percentage by weight of copper, expressed with respect to the total weight of the capture mass, may be in the range 1% to 59%, preferably in the range 5% to 40%, and more preferably in the range 6% to 30%.

The total percentage by weight of metals other than copper, expressed with respect to the total weight of the capture mass, may be in the range 1% to 59%, preferably in the range 1.5% to 30%, and more preferably in the range 2% to 10%.

The ratio of the percentage by weight of the metal or metals other than copper to the percentage by weight of copper is in the range 0.01 to 2, preferably in the range 0.02 to 1, more preferably in the range 0.05 to 0.6 and still more preferably in the range 0.1 to 0.6.

The percentage by weight of sulphur expressed with respect to the weight of the capture mass may be in the range 1% to 60%, preferably in the range 2% to 40%, more preferably in the range 2% to 15%, more preferably in the range 2% to 10%, and still more preferably in the range 4% and 10%.

In one embodiment of the present invention, the only metals present in the active phase of the capture mass of the invention may be copper, chromium, manganese, iron, cobalt and nickel. The capture mass of the invention may thus be free of other metals such as zinc.

The copper sulphide is preferably distributed in a homogeneous manner throughout the capture mass. Thus, it preferably does not form a shell at the surface of the capture mass.

In a variation and when, in the process for the preparation of said capture mass, the metal precursors are deposited either in a single impregnation step using a solution containing the precursors of all of the metals to be deposited, or in a plurality of impregnation steps commencing by impregnation with the copper precursor, the capture mass of the invention is further characterized in that the metal or metals other than copper is/are super-concentrated at the periphery of the capture mass. The term "super-concentration at the periphery of the capture mass" as used in the present invention means that the concentration of one element is higher at the periphery of the capture mass than in the centre of said mass.

Preferably, at least 70% and more preferably at least 80% by weight of the metal or metals other than copper contained in the capture mass of the invention are in a layer at the periphery of the capture mass. The periphery is generally defined as a layer which may be up to 4 mm thick, preferably up to 2 mm thick and highly preferably up to 1 mm thick. Clearly, the thickness of this peripheral layer is always less than the smallest characteristic dimension of the particle.

When the capture mass is in the form of a plurality of spherical particles, the thickness of this layer represents at most 45% of the diameter of each particle, preferably at most 40% of the diameter of each particle. The layer is preferably located less than 20% of the diameter from the outer edge of the particle, preferably less than 10% of the diameter from the outer edge of the particle.

The capture mass of the invention further comprises a porous solid support.

The porous solid support may represent in the range 5% to 99%, preferably in the range 20% to 98%, more preferably in the range 50% to 98% and still more preferably in the range 60% to 98% by weight of the weight of the total capture mass of the invention.

This porous solid support may be selected from supports which are conventional in the catalysis field. It may be selected from the group constituted by aluminas, silica-aluminas, silicas, clays, activated charcoals, zeolites, titanium oxides, zirconium oxides and mixtures thereof.

Advantageously, the porous solid support may be selected from supports with a controlled porosity. The porosity of activated charcoals is known to be highly variable and difficult to control. Almost systematically in activated charcoals, a porosity known as a microporous porosity is present, i.e. with a pore size of less than 2 nm as defined in the IUPAC nomenclature. The presence of these pores may affect the performance of the capture mass because the diffusion of heavy metals, in particular mercury, is not favoured in these micropores. Furthermore, the presence of micropores may cause capillary condensation phenomena, i.e. the formation of liquid phases in the pores of the solid support if the gaseous effluent contains condensable compounds, notably water and/or hydrocarbons.

The porous solid support of the invention can thus preferably be selected from aluminas and silica-aluminas the porosity of which is controlled. More preferably, the porous support is an alumina.

In the case in which the porous support is alumina, the porous solid support may be synthesized using various methods which are known to the skilled person.

A first method for the synthesis of an alumina support is as follows. A precursor of the aluminium trihydroxide type, $Al(OH)_3$, also known as hydrargillite or gibbsite, for example obtained from the process generally known as the "Bayer" process, is rapidly dehydrated. This dehydrated precursor is shaped, for example by granulation, then undergoes a hydrothermal treatment and finally calcining to obtain the desired alumina. This method is described in more detail, for example, in the section entitled "Alumina" by P. Euzen, P. Raybaud, X. Krokidis, H. Toulhoat, J. L. Le Loarer, J. P. Jolivet and C. Froidefond, in the "Handbook of Porous Solids" (F. Schüth, K. S. W. Sing and J. Weitkamp, Wiley-VCH, Weinheim, Germany, 2002). This method can be used to produce an alumina generally known as "flash alumina".

A second method for synthesizing the alumina support is as follows. A gel is initially obtained from a precursor of the aluminium gamma-oxy(hydroxide) type, AlO(OH) also known as boehmite, with high specific surface areas in the range 150 to 600 $m^2/g$. The boehmite gel may, for example, be obtained by precipitation from basic and/or acidic solutions of aluminium salts induced by changing the pH or any other method which is known to the skilled person. This gel is then shaped, for example by mixing/extrusion. Next, a series of heat or hydrothermal treatments is carried out on the product, resulting in production of the alumina. This method is also described in the section entitled "Alumina" by P. Euzen, P. Raybaud, X. Krokidis, H. Toulhoat, J. L. Le Loarer, J. P. Jolivet and C. Froidefond, in the "Handbook of Porous Solids" (F. Schüth, K. S. W. Sing and J. Weitkamp, Wiley-VCH, Weinheim, Germany, 2002). This method can be used to produce an alumina which is generally known as "alumina gel".

The porous solid support of the invention may comprise sodium. The weight content of the porous solid support, as the oxide of sodium, $Na_2O$, may be in the range 0 ppm by weight to 5000 ppm by weight, preferably in the range 100 ppm by weight to 5000 ppm by weight, and more preferably in the range 1000 ppm by weight to 5000 ppm by weight.

Further, the porous solid support of the invention may be selected as a function of its porosity. The porosity may be characterized by the specific surface area and/or the total pore volume. It should be understood that in the present application, the porosity characteristics relate to the porous solid support before depositing the active phase thereon. In fact, depending on the methods employed, deposition of the active phase might block the smallest pores, which could explain a difference between the porosity of the porous solid support before depositing the active phase and the final porosity of the capture mass of the invention.

In the present invention, the total pore volume was determined by mercury porosimetry (cf. Rouquerol F.; Rouquerol J.; Singh K. "Adsorption by Powders & Porous Solids: Principle, methodology and applications", Academic Press, 1999). In the present invention, the specific surface area was determined by the BET method described in the same reference work.

The porous solid support may have a total pore volume in the range 0.5 $cm^3/g$ to 1.5 $cm^3/g$, preferably in the range 0.6 $cm^3/g$ to 1.0 $cm^3/g$. The porous solid support may have a specific surface area in the range 50 $m^2/g$ to 400 $m^2/g$, preferably in the range 60 $m^2/g$ to 350 $m^2/g$, more preferably in the range 70 $m^2/g$ to 320 $m^2/g$, and still more preferably in the range 70 $m^2/g$ to 300 $m^2/g$.

The porous solid support may be in different forms, in particular in the divided form. Advantageously, the solid support may be in the form of a plurality of elements, each element being in the form of a bead, cylinder, multi-lobed extrudate, cartwheel, hollow cylinder or any other geometric form used by the skilled person.

The form of the porous solid support may determine the form of the capture mass per se. The capture mass of the invention may thus be in the form of a plurality of beads, cylinders, multi-lobed extrudates, cartwheels or hollow cylinders or particles of any other geometric form used by the skilled person.

In one embodiment, the capture mass may be in the form of a plurality of beads with a diameter in the range 0.4 mm to 20 mm, preferably in the range 0.5 mm to 15 mm, and more preferably in the range 0.5 mm to 10 mm, or in the form of a plurality of three-lobed extrudates with a diameter and length in the range 0.4 mm to 20 mm, preferably in the range 0.5 mm to 15 mm, and more preferably in the range 0.5 mm to 10 mm.

The present invention also concerns the process for the preparation of the capture mass described hereinabove.

The capture mass of the invention may be prepared using various synthesis pathways known to the skilled person. Preferably, this capture mass is prepared by preparing a material comprising metal oxides, then sulphurizing that material to transform the metal oxides into metal sulphides.

The process for the preparation of the capture mass of the invention comprises the following steps:

A. preparing a material comprising a porous solid support, a copper compound and at least one second metallic compound the metal of which is selected from the group constituted by chromium, manganese, iron, cobalt and nickel, and B. sulphurizing the material obtained at the end of step (A) to transform the metallic compounds into metal sulphides.

Step A of the process of the invention consists of preparing a material comprising a porous solid support, a copper compound and at least one second metallic compound the metal of which is selected from the group constituted by chromium, manganese, iron, cobalt and nickel. Preferably, the copper compound is copper oxide, and the second metallic compound the metal of which is selected from the group constituted by chromium, manganese, iron, cobalt and nickel is a metal oxide.

This step (A) may be carried out using conventional methods which are known to the skilled person, in particular in the catalyst preparation field. In particular, this material may be prepared by co-granulation of a plurality of powders including that of the support and the various precursors of the metals which are desired in the capture mass, or by impregnating the porous solid support with at least one solution containing the metal or metals to be deposited. Preferably, the capture mass is prepared by impregnation. Impregnation may be dry impregnation or wet impregnation, preferably dry.

The term "wet impregnation" means an impregnation process in which the porous solid support is immersed in a solution containing the metal or metals to be deposited with a volume which is in excess with respect to the pore volume of the support.

The term "dry impregnation" means an impregnation process in which the porous solid support is filled with an impregnation solution containing the metal or metals to be deposited with a volume which is just that necessary for occupying all of the pore volume of the support.

In one implementation of the invention, in order to prepare a capture mass of the present invention, the porous solid support may be impregnated with at least one copper precursor and with at least one precursor of a metal selected from chromium, manganese, iron, cobalt and nickel.

The metal precursors may be any metallic salt which is soluble in water. The precursors of the metals may in particular be selected from the group constituted by metal acetates, metal nitrates, metal hydroxides, metal carbonates and mixtures thereof. Preferably, the metal precursors are metallic nitrates.

The quantities of the metal precursors introduced into the impregnation solution or solutions are selected such that the ratio of the percentage by weight of the metal or metals other than copper to the percentage by weight of copper is in the range 0.01 to 2 in the final capture mass.

The metal precursors may be dissolved in water prior to depositing them on the porous solid support. In one implementation of the invention, these metal precursors may be deposited in a single impregnation step using a solution containing the precursors of all of the metals to be deposited or in several impregnation steps, each being carried out with a solution containing the precursors of all or some of the metals to be deposited. However, the inventors have observed that in a preferred variation, in order for the capture mass to have an super-concentration of metal or metals other than copper at the periphery of the capture mass, the metal precursors must be deposited either in a single impregnation with the aid of a solution containing the precursors of all of the metals to be deposited, or in several impregnation steps, commencing with impregnation with the copper precursor.

In a preferred implementation, the metals are deposited on the porous solid support in a single impregnation step.

In this implementation, step (A) of the process for the preparation of the capture mass of the invention may comprise the following sub-steps:
   a. preparing an aqueous solution containing at least one copper precursor and at least one precursor of a metal selected from the group constituted by chromium, manganese, iron, cobalt and nickel;
   b. impregnating a porous solid support with an aqueous solution obtained at the end of step (a);
   c. maturing the impregnated support obtained at the end of step (b) in a sealed vessel saturated with water; and
   d. drying the material obtained at the end of step (c).

This implementation can be used to obtain a super-concentration of metal or metals other than copper at the periphery of the capture mass.

In another implementation, the metals are deposited on the porous solid support in several impregnation steps.

In this other implementation, step (A) of the process for the preparation of the capture mass of the invention may comprise the following sub-steps:
   a'. preparing a first aqueous solution containing at least one copper precursor;
   a". preparing a second aqueous solution containing at least one precursor of a metal selected from the group constituted by chromium, manganese, iron, cobalt and nickel;
   b'. impregnating a porous solid support with the first aqueous solution obtained at the end of step (a') and/or with the second aqueous solution obtained at the end of step (a");
   c'. maturing the impregnated support obtained at the end of step (b') in a sealed vessel saturated with water;
   d'. drying the material obtained at the end of step (c');
   e. impregnating the dried material obtained at the end of step (d') with the first aqueous solution obtained at the end of step (a') and/or the second aqueous solution obtained at the end of step (a"),
   f. maturing the impregnated support obtained at the end of step (e) in a sealed vessel saturated with water;
   g. drying the material obtained at the end of step (f).

The choice of impregnation solutions prepared during steps (a) and (a') and their order of use during impregnation steps (b') and (e) are free provided, of course, that at least one copper precursor and at least one precursor of a metal selected from the group constituted by chromium, manganese, iron, cobalt and nickel are deposited on the final material which is obtained.

In another implementation for obtaining a super-concentration of metal or metals other than copper at the periphery of the capture mass, the metals are deposited on the porous solid support in several impregnation steps, commencing with impregnation with the copper precursor. In this implementation, step (A) of the process for the preparation of the capture mass of the invention may comprise the following sub-steps:
   a'. preparing a first aqueous solution containing at least one copper precursor;
   a". preparing a second aqueous solution containing at least one precursor of a metal selected from the group constituted by chromium, manganese, iron, cobalt and nickel;
   b'. impregnating a porous solid support with the first aqueous solution obtained at the end of step (a');
   c'. maturing the impregnated support obtained at the end of step (b') in a sealed vessel saturated with water;
   d'. drying the material obtained at the end of step (c');
   e. impregnating the dried material obtained at the end of step (d') using the second aqueous solution obtained at the end of step (a");

f. maturing the impregnated support obtained at the end of step (e) in a sealed vessel saturated with water; and g. drying the material obtained at the end of step (f).

Steps (c), (c') and (f) for maturing the impregnated support are carried out in a sealed vessel saturated with water, preferably at a temperature in the range 20° C. to 60° C., and for a period which is preferably in the range 0.5 hours to 8 hours. Maturation steps (c), (c') and (f) are generally carried out at ambient temperature.

Drying steps (d), (d') and (g) may be carried out in air at a temperature which may be in the range 70° C. to 250° C., preferably in the range 80° C. to 200° C.

Advantageously, step (A) of the process for the preparation of the capture mass of the invention may further comprise a step (h) in which the dried material obtained at the end of step (d), (d') and/or (g) undergoes calcining in air.

This calcining may be carried out at a temperature in the range 300° C. to 800° C., preferably in the range 350° C. to 600° C. Preferably, during step (h), the material is calcined in air with a relative humidity at 25° C. in the range 10% to 80%, preferably in the range 15% to 50%.

Clearly, this calcining step (h) may be carried out after any drying step involved in the process for the preparation of the capture mass of the invention. In the process comprising a single impregnation step, this calcining step (h) may be carried out at the end of step (d). In the process comprising several impregnations, this calcining step (h) may be carried out at the end of step (d'), or at the end of step (g), or indeed at the end of step (d') and at the end of step (g). In the case of several calcining steps (h) during preparation of the catalyst, these may be carried out under the same conditions or under different conditions. If a calcining step (h) is carried out at the end of step (d'), then clearly, step (e) consists of impregnation of the dried and calcined material obtained at the end of step (h). Further, the preparation of the capture mass of the invention does not exclude a plurality of additional impregnation steps. In this case, the steps of impregnation, maturation and drying, and optionally calcining, may be repeated as many times as is necessary with identical or different impregnating solutions.

Sulphurization step (B) may be carried out using any method which is known to the skilled person, leading to the formation of metal sulphides which are reactive towards heavy metals, in particular mercury. The sulphur is generally added by means of hydrogen sulphide, elemental sulphur or with the aid of an organo-sulphur precursor which is known to the skilled person. Sulphurization step (B) may be carried out in the gas phase or in the liquid phase, depending on the type of sulphur precursor used.

Sulphurization step (B) may advantageously be carried out in the gas phase using a gas containing hydrogen sulphide. In particular, it is possible to use a gaseous mixture of nitrogen and hydrogen sulphide with a molar concentration of hydrogen sulphide which may be in the range 1000 ppm to 10%, preferably in the range 0.5% to 6%, at a temperature which may be in the range 100° C. to 400° C., preferably in the range 120° C. to 250° C.

Preferably, sulphurization step (B) may be carried out at atmospheric pressure.

Sulphurization step (B) may be carried out ex-situ or in-situ, i.e. outside or within the heavy metal capture equipment containing the capture mass, which will be used to capture the heavy metals from an effluent. Preferably, sulphurization step (B) is carried out ex-situ in the gas phase.

Sulphurization step (B) may be characterized in that it can transform at least 80%, preferably at least 90%, and more preferably at least 95% of the metal oxides of the material obtained at the end of step (A) into metal sulphides.

The capture mass of the invention, which may have been prepared as described above, may advantageously be used as a capture mass for heavy metals. The process for capturing heavy metals in a gaseous or liquid effluent with the aid of the capture mass of the invention is also proposed in the present invention.

The gaseous or liquid effluent to be treated may contain heavy metals, for example mercury, arsenic or lead, in various forms. As an example, mercury may be found in the $Hg^0$ form, corresponding to elemental or atomic mercury, in the molecular form and/or in the ionic form, for example $Hg^{2+}$ and its complexes. The concentration of heavy metals in the gaseous or liquid effluent to be treated may vary. The gaseous effluent to be treated may preferably contain between 10 ng and 1 g of mercury per $Nm^3$ of gas. The liquid effluent to be treated may preferably contain between 10 ng and 1 g of mercury per $m^3$ of liquid. Further, this gaseous or liquid effluent to be treated may contain arsenic and/or lead in different forms. The quantity of lead in the effluent may be in the range 1 ppt (parts per trillion, i.e. $10^{-12}$) by weight to 100 ppm (parts per million, i.e. $10^{-6}$) by weight, and the quantity of arsenic may be in the range 100 ppt by weight to 100 ppb (parts per billion, i.e. $10^{-9}$) by weight. These heavy metals are a nuisance for safety reasons and for reasons of the efficiency of the treatments for these effluents, and so advantageously they have to be eliminated using the capture mass of the invention, or at least their contents have to be reduced. Finally, the effluent to be treated may contain other elements such as sulphur and nitrogen in various forms. In particular, the sulphur may be present in the form of mercaptans, organic sulphur or thiophene. The sulphur content of the effluent may be in the range 1 ppt by weight to 1000 ppm by weight, and the nitrogen content may be in the range 1 ppt by weight to 100 ppm by weight. Advantageously, neither the nitrogen nor the sulphur which may be present in the effluent to be treated causes drops in the performance of the capture masses of the invention.

In contrast to the materials described in the prior art, the capture mass of the present invention can be used to treat both liquid and gaseous effluents. Further, the effluent may be a wet gas or a gas containing condensable compound vapours without notably reducing the service life of the capture mass. The hygrometry ratio of the gaseous effluent, defined as the ratio of the partial pressure of water to the saturated vapour pressure of water at a given temperature, may be in the range 0 to 100%, preferably in the range 1% to 95%, and more preferably in the range 2% to 90%.

The use of the capture mass of the invention is particularly suited to the treatment of liquid or gaseous effluents of oil origin and their derivatives. Such effluents routinely contain heavy metals. The gaseous or liquid effluent to be treated in the process of the invention may advantageously be selected from the group constituted by combustion fumes, synthesis gas, natural gas, natural gas condensates, petroleum, liquid or gaseous oil cuts, petrochemical intermediates and mixtures thereof. Preferably, the gaseous or liquid effluent to be treated in the process of the invention is advantageously selected from the group constituted by combustion fumes, synthesis gas, natural gas, natural gas condensates, crude oil and liquid hydrocarbon cuts from the refinery or from a petrochemicals plant.

Combustion fumes are in particular produced by the combustion of hydrocarbons, biogas and coal in a boiler or by a combustion gas turbine, for example with the intention of producing electricity. The temperature of these fumes is generally in the range 20° C. to 60° C., with a pressure generally in the range 0.1 MPa (1 bar) to 0.5 MPa (5 bar) and may comprise, by volume, between 50% and 80% of nitrogen, between 5% and 40% of carbon dioxide, between 1% and 20% of oxygen, and impurities such as $SO_x$ and $NO_x$ if these impurities have not been eliminated downstream by a deacidification process.

Synthesis gas is a gas containing carbon monoxide CO, hydrogen $H_2$ in a molar $H_2/CO$ ratio which is generally equal to approximately 2, steam, generally saturated, and carbon dioxide $CO_2$ which is generally at a content of approximately 10% by volume. The pressure of the synthesis gases which are most frequently encountered in the industry is generally in the range 2 MPa (20 bars) to 3 MPa (30 bars), but it may reach 7 MPa (70 bars). In addition, synthesis gas may contain sulphur-containing impurities ($H_2S$, COS . . . ), nitrogen-containing impurities ($NH_3$, HCN . . . ) and halogen-containing impurities.

Natural gas is primarily constituted by gaseous hydrocarbons, but it may contain some of the following acidic compounds: carbon dioxide $CO_2$, hydrogen sulphide $H_2S$, mercaptans, carbon oxysulphide COS and carbon disulphide $CS_2$. The quantity of these acidic compounds in natural gas can vary widely and may be up to 40% by volume for $CO_2$ and $H_2S$. The temperature of the natural gas which is most frequently employed in the industry may be in the range 20° C. to 100° C., and its pressure may be in the range 1 MPa (10 bars) to 20 MPa (200 bars).

Natural gas condensates are constituted by liquid hydrocarbons the production of which is associated with the production of natural gas. These complex liquid mixtures are very similar to crude oils.

Particular examples of liquid refinery hydrocarbons which may be cited are LPG (C3-C4 cut), naphthas (C5-C8 cut), kerosenes and diesels.

Liquid hydrocarbons from petrochemicals plants which may in particular be cited are LPG (C3-C4 cut) and cracked gasolines (or "pyrolysis gasoline", also known as "Pygas").

In the process for capturing heavy metals in a gaseous or liquid effluent of the invention, said effluent is brought into contact with the capture mass of the invention. This contact can preferably be carried out by injecting the effluent to be treated into a reactor containing the capture mass in the form of a fixed bed.

This contact of the effluent to be treated with the capture mass in the process of the invention may be carried out at a temperature in the range −50° C. to 115° C., preferably in the range 0° C. to 110° C., more preferably in the range 20° C. to 100° C. Further, it can be carried out at an absolute pressure in the range 0.01 MPa (0.1 bar) to 20 MPa (200 bars), preferably in the range 0.1 MPa (1 bar) to 15 MPa (150 bars), and more preferably in the range 0.1 MPa (1 bar) to 12 MPa (120 bars).

In addition, this step for bringing the effluent to be treated into contact with the capture mass may be carried out with an HSV in the range 0.1 $h^{-1}$ to 50000 $h^{-1}$. The term "HSV" means the hourly space velocity of the gaseous or liquid effluent in the capture mass, i.e. the volume of gaseous or liquid effluent per volume of reactor and per hour. For a gaseous effluent to be treated, the HSV may preferably be in the range 50 $h^{-1}$ to 500 $h^{-1}$. For a liquid effluent to be treated, the hourly space velocity may be in the range 0.1 $h^{-1}$ to 50 $h^{-1}$.

Prior to bringing the liquid or gaseous effluent into contact with the capture mass, said gaseous or liquid effluent may be pre-treated. This pre-treatment may consist of heating or cooling, pressurizing or depressurizing, and/or a purification treatment for eliminating or reducing the quantity of a compound which is deemed to be unwanted in the effluent. As an example, the pre-treatment may comprise a step for reducing the relative humidity of a gaseous effluent. The reduction in the relative humidity of a gaseous effluent may be obtained using any means which is known to the skilled person, in particular a capture mass for water, for example a molecular sieve based on zeolite, a glycol process as described, for example, in document WO 2005/047438, a step for heating the effluent in a heat exchanger to raise its temperature, for example from 3° C. to 10° C., or a step for cooling the effluent.

Contact with the capture mass may advantageously be used to capture heavy metals contained in the effluent to be treated and to obtain an effluent with a heavy metal content which is reduced with respect to the initial effluent content, or indeed to completely eliminate the heavy metals from the effluent.

Advantageously, the reduction in the total heavy metal weight content between the gaseous or liquid effluent before treatment and the effluent obtained after treatment with the capture mass of the invention may represent at least 90%, preferably at least 95% and more preferably at least 99%.

Other characteristics and advantages of the invention will become apparent from the following non-limiting, purely illustrative examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 12/62.527, filed Dec. 21, 2012, and French application No. 12/62.526 filed Dec. 21, 2012 are incorporated by reference herein.

EXAMPLES

Example 1

This example demonstrates the importance of the ratio of the percentage by weight of the metal or metals other than copper to the percentage by weight of copper.

A series of adsorbents was prepared from two types of support.

Support A was an alumina prepared using the "flash alumina" synthesis method. The first step consisted of rapid dehydration of gibbsite at a high temperature (800° C.) and with a short contact time (0.8 seconds) in order to obtain a $\chi$ (chi) transition alumina powder. Washing to reduce the $Na_2O$ content was carried out using water (3 kg/kg of $Al_2O_3$), followed by a second rapid dehydration treatment similar to the preceding one, also to obtain an alumina powder. This powder was then shaped using a bowl granulator. A hydrothermal treatment was carried out at a high partial pressure of water (100%) for 8 h. The beads obtained were dried at 150° C. then calcined at 500° C.

Support B was an alumina prepared using the "alumina gel" synthesis method. The alumina gel was synthesised via a mixture of sodium aluminate and aluminium sulphate. The precipitation reaction was carried out at a temperature of 60° C., a pH of 9, for 60 minutes and with stirring at 200 rpm. The gel obtained underwent mixing in a Z arm mixer to produce a paste. Extrusion was carried out by passing the paste through a die provided with a 1.6 mm diameter orifice with a three-lobed form. The extrudates obtained were dried at 150° C. then calcined at 500° C.

The characteristics of these supports are recorded in Table 1.

TABLE 1

| | Support | |
|---|---|---|
| | A | B |
| Type | "flash alumina" | "alumina gel" |
| Specific surface area (m$^2$/g) | 132 | 173 |
| Total pore volume (cm$^3$/g) | 0.98 | 0.8 |
| Na$_2$O content (ppm) | 800 | 30 |

The total pore volume was determined by mercury porosimetry, as described in the work by Rouquerol F.; Rouquerol J.; Singh K. "Adsorption by Powders & Porous Solids: Principle, methodology and applications", Academic Press, 1999.

The specific surface area was determined using the BET method, as described in the work by Rouquerol F.; Rouquerol J.; Singh K. "Adsorption by Powders & Porous Solids: Principle, methodology and applications", Academic Press, 1999.

Either copper alone in a single step, or copper and another metal in one or two steps, was deposited on these supports. This or these steps consisted of one or two dry impregnation steps, meaning that the volume of the impregnation solutions corresponded exactly to the water takeup volume of the support, i.e. to the accessible pore volume of the aluminas.

The one-step impregnation protocol was as follows:
 a) dissolve copper nitrate and possibly manganese or iron nitrate in 50 mL of water; the masses of the nitrate precursors are determined with respect to the final copper, iron and manganese content, in grams per gram of envisaged sulphur-containing capture mass;
 b) impregnate the support by slow spraying;
 c) mature in a closed vessel for 3 h at ambient temperature;
 d) dry at 90° C. for 3 h;
 e) calcine at 450° C. in a wet atmosphere for a period of 45 min.

The two-step impregnation protocol was as follows:
 a) dissolve copper nitrate in 50 mL of water on the one hand and dissolve manganese or iron nitrate in 50 mL of water on the other hand; the masses of the nitrate precursors are determined with respect to the final copper, iron and manganese content, in grams per gram of envisaged sulphur-containing capture mass;
 b) impregnate the support by slow spraying using the copper nitrate solution;
 c) mature in a closed vessel for 3 h at ambient temperature;
 d) dry at 90° C. for a period of 3 h;
 e) calcine at 450° C. in a wet atmosphere for a period of 45 min;
 f) impregnate by slow spraying of the support using the manganese or iron nitrate solution;
 g) mature in a closed vessel for 3 h at ambient temperature;
 h) dry at 90° C. for a period of 3 h;
 i) calcine at 450° C. in a wet atmosphere for a period of 45 min.

An ex-situ sulphurizing step carried out at atmospheric pressure in a stream containing 5 mole % of H$_2$S diluted in nitrogen at a temperature of 150° C. was applied to the materials as prepared above.

According to the thermochemical calculations carried out using HSC Chemistry 7 software from Outotec (Outotec Oyj, Riihitontuntie 7 D, PO Box 86, FI-02200 Espoo, Finland), the reactions which are susceptible of occurring between mercury and deposited metal sulphides (copper, iron, manganese) are as follows:

$$2CuS+Hg \rightarrow Cu_2S+HgS$$

$$FeS_2+Hg \rightarrow FeS+HgS$$

$$MnS_2+Hg \rightarrow MnS+HgS$$

In all cases, the theoretical adsorption capacity at mercury saturation of the sulphur-containing capture masses (% Hg$_{theo}$) is determined by applying the following formula:

$$\% \ Hg_{theo} = \frac{\% \ S}{2} \times \frac{M_{Hg}}{M_S} \times 100$$

in which % S represents the percentage by weight of sulphur with respect to the total weight of the capture mass, M$_{Hg}$ represents the molar atomic mass of mercury and M$_S$ represents the molar atomic mass of sulphur.

The actual mercury adsorption performances of the capture masses prepared as described above were tested in a reactor R$_1$. A bead of liquid mercury of approximately 30 g was first of all poured into a glass dish which was then deposited in the bottom of the 1 L volume reactor R$_1$. A mass m$_m$ of the capture mass was deposited in a metal mesh combustion boat which was then introduced into the interior of the reactor R$_1$.

The reactor R$_1$ was introduced into a heated vessel set at T=70° C. for 1 week. The metal combustion boat containing the capture mass was then recovered and weighed (weighed mass m$_m$').

The difference in mass of the capture mass before and after contact with the mercury in the reactor R$_1$ provided access to the quantity of mercury captured by the capture mass. This quantity, normalized to the mass of the capture mass, produced the actual capture capacity of the capture mass for mercury (% Hg$_{actual}$):

$$\% \ Hg_{actual} = \frac{m'_m - m_m}{m_m} \times 100.$$

Possible synergy between the various metal sulphides deposited on the polymetallic capture mass could be demonstrated if the measurement of the actual mercury saturation adsorption capacity for the polymetallic capture masses was higher than the theoretical mercury saturation capacity for the polymetallic capture masses, i.e. if the ratio % Hg$_{actual}$/% Hg$_{theo}$ was strictly greater than 1.

Various capture masses were prepared as described in Table 2. The percentage by weight of sulphur was measured by elemental CHNS analysis.

TABLE 2

| Capture mass | Type | Support | Metals | No of impregnations | % Fe/% Cu or % Mn/% Cu | % Hg$_{actual}$/ % Hg$_{theo}$ |
|---|---|---|---|---|---|---|
| 1 | Not in accordance with the invention | A | Cu | 1 | — | 0.94 |
| 2 | Not in accordance with the invention | B | Cu | 1 | — | 0.99 |
| 3 | Not in accordance with the invention | A | Cu + Fe | 2 | 2.8 | 0.92 |
| 4 | In accordance with the invention | A | Cu + Fe | 2 | 0.6 | 1.34 |
| 5 | In accordance with the invention | B | Cu + Fe | 1 | 0.3 | 1.55 |
| 7 | In accordance with the invention | A | Cu + Mn | 1 | 0.4 | 1.27 |

The capture masses containing only copper, irrespective of the support, had actual mercury saturation adsorption capacities which were slightly lower than the theoretical capacities deduced from the sulphur content measured by elemental analysis.

Adding another metal, be it iron or manganese, in proportions in which the percentage by weight of metal to the percentage by weight of copper is less than 2, on any support, resulted in capture masses which adsorbed more mercury at saturation than theoretically predicted. Thus, a synergistic effect had indeed been established between the two metal sulphides.

Example 2

This example demonstrates the preparation of a capture mass in which the metal or the metals other than copper is/are in a super-concentration at the periphery of the capture mass and its adsorption capacity.

The support was the support A prepared in Example 1. Either copper alone in a single step, or copper and iron in one or two steps was deposited on this support. The step or these steps consisted of one or more dry impregnation steps, which meant that the volume of the impregnation solutions corresponded exactly to the water takeup volume of the support, i.e. to the accessible pore volume of the aluminas.

The single step impregnation protocol was as follows:
a) dissolve copper nitrate and possibly iron nitrate in 50 mL of water; the masses of the nitrate precursors are determined with respect to the final copper, iron and manganese content, in grams per gram of envisaged sulphur-containing capture mass;
b) impregnate the support by slow spraying;
c) mature in a closed vessel for 3 h at ambient temperature;
d) dry at 90° C. for 3 h;
e) calcine at 450° C. in a wet atmosphere for a period of 45 min.

The two-step impregnation protocol was as follows:
a) dissolve copper nitrate in 50 mL of water on the one hand and dissolve manganese or iron nitrate in 50 mL of water on the other hand; the masses of the nitrate precursors are determined with respect to the final copper, iron and manganese content, in grams per gram of envisaged sulphur-containing capture mass;
b) impregnate the support by slow spraying using the copper nitrate solution;
c) mature in a closed vessel for 3 h at ambient temperature;
d) dry at 90° C. for a period of 3 h;
e) calcine at 450° C. in a wet atmosphere for a period of 45 min;
f) impregnate by slow spraying of the support using the iron nitrate solution;
g) mature in a closed vessel for 3 h at ambient temperature;
h) dry at 90° C. for a period of 3 h;
i) calcine at 450° C. in a wet atmosphere for a period of 45 min.

An ex-situ sulphurizing step carried out at atmospheric pressure in a stream containing 5 mole % of $H_2S$ diluted in nitrogen at a temperature of 150° C. was applied to the materials as prepared above.

The capture masses obtained were characterized using a Castaing microprobe. Analysis using an electronic microprobe or Castaing microprobe consists of bombarding a material with an electron beam to excite the electrons of its surface and cause it to emit X rays with an energy spectrum containing characteristic peaks of the emitting elements. The X ray spectrum was acquired using wavelength dispersion spectrometers (WDS) which allowed the elements to be identified and their contents to be quantified. This measurement was carried out at different locations of the particle in order to be able to trace the profile of each element over the diameter of the particle cut into two. The instrument used was a JEOL 8100.

The actual mercury adsorption performances of the capture masses prepared as described above were tested in a reactor $R_1$. A bead of liquid mercury of approximately 30 g was first of all poured into a glass dish which was then deposited in the bottom of the 1 L volume reactor $R_1$. A mass $m_m$ of the capture mass was deposited in a metal mesh combustion boat which was then introduced into the interior of the reactor $R_1$.

The reactor $R_1$ was introduced into a heated vessel set at T=70° C. for 1 week. The metal combustion boat containing the capture mass was then recovered and weighed (weighed mass $m_m$').

The theoretical adsorption capacity at mercury saturation of the sulphur-containing capture masses (% $Hg_{theo}$) and the actual mercury capture capacity of the capture mass (% $Hg_{actual}$) were calculated in the same manner as in Example 1.

Various capture masses were prepared as described in Table 3. The percentage by weight of sulphur was measured by elemental CHNS analysis.

TABLE 3

| Capture mass | Type | No of impregnations | 1st impregnated metal | 2nd impregnated metal | % Fe/% Cu | % $Hg_{actual}$/% $Hg_{theo}$ |
|---|---|---|---|---|---|---|
| 1 | Not in accordance with the invention | 1 | Cu | — | — | 0.94 |
| 2 | In accordance with the invention | 2 | Fe | Cu | 0.3 | 1.11 |
| 3 | In accordance with the invention | 2 | Cu | Fe | 0.3 | 1.37 |
| 4 | In accordance with the invention | 1 | Cu + Fe | — | 0.3 | 1.32 |

The capture mass containing only copper had an actual mercury saturation adsorption capacity which was slightly lower than the theoretical adsorption capacity calculated from the sulphur content measured by elemental analysis.

The bimetallic capture mass where the copper and the iron were impregnated separately and in which the iron had been impregnated onto the support (mass 2) first had a mercury saturation adsorption capacity which was very slightly higher than the theoretical capacity. In contrast, capture masses 3 and 4, where the iron was deposited onto the support after or at the same time as the copper had very much higher mercury saturation adsorption capacities than the theoretical capacities. The synergistic effect between the copper and the iron is thus much more significant when the iron is deposited onto the support after or at the same time as the copper.

According to the Castaing microprobe analyses shown in FIG. 1, it can be seen that the capture mass 3 of the invention has a non-homogeneous iron distribution: there is a shell of the order of 400 μm (micrometers) on the bead where the iron is super-concentrated. In contrast, the iron is distributed uniformly in the particles of the capture mass 2. The synergistic effect is thus greatly reinforced if the iron is super-concentrated at the periphery of the capture mass particles, which occurs if the iron is deposited onto the support after or at the same time as the copper.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A capture mass for capturing heavy metals in a liquid or gaseous effluent, comprising a porous solid support, copper sulphide and at least one second metal sulphide the metal of which is selected from the group consisting of chromium, manganese, iron, cobalt and nickel, wherein the ratio of the percentage by weight of the metal or metals other than copper to the percentage by weight of copper is in the range of 0.01 to 2, and wherein the copper sulphide is distributed homogeneously throughout the capture mass and the metal or metals other than copper is super-concentrated at the periphery of the capture mass.

2. A capture mass according to claim 1, wherein the metal of the second metal sulphide is manganese or iron.

3. A capture mass according to claim 1, wherein the metal of the second metal sulphide is iron.

4. A capture mass according to claim 1, wherein the porous solid support is an alumina.

5. A capture mass according to claim 1, wherein the copper sulphide is CuS.

6. A capture mass according to claim 1, wherein said ratio of the percentage by weight of the metal or metals other than copper to the percentage by weight of copper is in the range of 0.02 to 1.

7. A capture mass according to claim 1, wherein said ratio of the percentage by weight of the metal or metals other than copper to the percentage by weight of copper is in the range of 0.05 to 0.6.

8. A capture mass according to claim 1, wherein said ratio of the percentage by weight of the metal or metals other than copper to the percentage by weight of copper is in the range of 0.1 to 0.6.

9. A capture mass according to claim 1, wherein the total percentage by weight of metals, expressed with respect to the total weight of the capture mass, is in the range of 1% to 60%.

10. A capture mass according to claim 1, wherein the total percentage by weight of copper, expressed with respect to the total weight of the capture mass, is in the range of 1% to 59%.

11. A capture mass according to claim 1, wherein the total percentage by weight of metals other than copper, expressed with respect to the total weight of the capture mass, is in the range of 1% to 59%.

12. A capture mass according to claim 1, wherein the porous solid support has a total pore volume in the range of 0.5 $cm^3$/g to 1.5 $cm^3$/g and a specific surface area in the range of 50 $m^2$/g to 400 $m^2$/g.

13. A capture mass according to claim 1, wherein at least 70% by weight of the metal or metals other than copper contained in said capture mass are in a layer at the periphery of the capture mass.

14. A process for preparing a capture mass according to claim 1, comprising
- (A) preparing a material comprising a porous solid support, a copper compound and at least one second metallic compound the metal of which is selected from the group consisting of chromium, manganese, iron, cobalt and nickel, comprising
  - (a) preparing an aqueous solution containing at least one copper precursor and at least one precursor of a metal selected from the group consisting of chromium, manganese, iron, cobalt and nickel;
  - (b) impregnating a porous solid support with the aqueous solution obtained at the end of step (a);
  - (c) e maturing the impregnated support obtained at the end of (b) in a sealed vessel saturated with water;
  - (d) drying the material obtained at the end of step (c); and
- (B) sulphurizing the material obtained at the end of step (A) to transform the metallic compounds into metal sulphides.

15. A process for preparing a capture mass according to claim 13, comprising
- (A) preparing a material comprising a porous solid support, a copper compound and at least one second metallic compound the metal of which is selected from the group consisting of chromium, manganese, iron, cobalt and nickel, comprising
  - (a') preparing a first aqueous solution containing at least one copper precursor;
  - (a") preparing a second aqueous solution containing at least one precursor of a metal selected from the group consisting of chromium, manganese, iron, cobalt and nickel;
  - (b') impregnating a porous solid support with the first aqueous solution obtained at the end of step (a') and/or with the second aqueous solution obtained at the end of step (a");
  - (c') maturing the impregnated support obtained at the end of step (b') in a sealed vessel saturated with water;
  - (d') drying the material obtained at the end of step (c');
  - (e) impregnating the dried material obtained at the end of step (d') with the first aqueous solution obtained at the end of step (a') and/or the second aqueous solution obtained at the end of step (a");
  - (f) maturing the impregnated support obtained at the end of step (e) in a sealed vessel saturated with water;
  - (g) drying the material obtained at the end of step (f); and
- (B) sulphurizing the material obtained at the end of step (A) to transform the metallic compounds into metal sulphides.

16. A process according to claim 15, in which the dried material obtained at the end of step (d), (d') and/or (g) undergoes a calcining step in air during a step (h).

17. A process for preparing a capture mass according to claim 1, comprising
- (A) preparing a material comprising a porous solid support, a copper compound and at least one second metallic compound the metal of which is selected from the group consisting of chromium, manganese, iron, cobalt and nickel, comprising
  - (a') preparing a first aqueous solution containing at least one copper precursor;
  - (a") preparing a second aqueous solution containing at least one precursor of a metal selected from the group consisting of chromium, manganese, iron, cobalt and nickel;
  - (b') impregnating a porous solid support with the first aqueous solution obtained at the end of step (a');
  - (c') F maturing the impregnated support obtained at the end of step (b') in a sealed vessel saturated with water;
  - (d') drying the material obtained at the end of step (c');
  - (e) impregnating the dried material obtained at the end of step (d') with the second aqueous solution obtained at the end of step (a");
  - (f) maturing the impregnated support obtained at the end of step (e) in a sealed vessel saturated with water;
  - (g) drying the material obtained at the end of step (f); and
- (B) sulphurizing the material obtained at the end of step (A) to transform the metallic compounds into metal sulphides.

18. A process for capturing heavy metals in a gaseous or liquid effluent, comprising bringing into contact said effluent with a capture mass according to claim 1.

19. A process according to claim 18, wherein the gaseous or liquid effluent contains mercury.

* * * * *